United States Patent [19]

Hooper

[11] 4,132,392
[45] Jan. 2, 1979

[54] METAL CUTTING MACHINE WITH MOVABLE TORCH FEEDING SYSTEM

[75] Inventor: Harry Hooper, Brookfield, Wis.

[73] Assignee: C-R-O, Inc., Menomonee Falls, Wis.

[21] Appl. No.: 819,359

[22] Filed: Jul. 27, 1977

[51] Int. Cl.² ............................................. B23K 7/10
[52] U.S. Cl. .................................................... 266/69
[58] Field of Search ....................... 266/48, 49, 58, 60, 266/69, 73, 77

[56] References Cited

U.S. PATENT DOCUMENTS

| | | | |
|---|---|---|---|
| 3,845,942 | 11/1974 | Roeder | 266/77 |
| 3,866,892 | 2/1975 | Hooper | 266/77 |

FOREIGN PATENT DOCUMENTS 48-32491  10/1973  Japan ........................................ 266/69

OTHER PUBLICATIONS

Airco, Catalog 7, No. 50, Travograph Gas Cutting Machine, 1970.

*Primary Examiner*—Howard N. Goldberg
*Assistant Examiner*—Paul A. Bell
*Attorney, Agent, or Firm*—Andrus, Sceales, Starke & Sawall

[57] ABSTRACT

A metal plate cutting machine has a transverse bridge which carries a master torch which is selectively driven therealong. A torch bar is suspended from the front side of the bridge by end slides which are freely movable along the bridge, with the bar carrying a plurality of slave torches. Both the master torch and the slave torches are clampable to the torch bar. The end slides are cantilevered rearwardly to form supports to which a torch supply cable festoon system is mounted. The supports also form part of a mount element which carries the cable manifold, electronic controls and the like. When the master torch is clamped to the torch bar and driven along the bridge, the torch bar and its related cantilevered slides and the festoon, manifold, and controls will likewise move along the bridge. When the torches are unclamped from the torch bar and the master torch driven along the bridge until it pushes the adjacent slave torches into a torch bar stop, the same elements will also subsequently be moved along the bridge.

1 Claim, 7 Drawing Figures

METAL CUTTING MACHINE WITH MOVABLE TORCH FEEDING SYSTEM

PRIOR ART OF INTEREST

| Patent No. | Date | Inventor |
| --- | --- | --- |
| 1,774,865 | 9/2/30 | Allison |
| 2,345,412 | 3/28/44 | Moore |
| 2,457,337 | 12/28/48 | Yoch et al |
| 2,496,110 | 1/31/50 | Thurman, Jr. |
| 3,328,555 | 6/27/67 | Dinter, Jr. |
| 3,717,332 | 2/20/73 | Luker et al |
| 3,845,942 | 11/5/74 | Roeder |

BACKGROUND AND SUMMARY OF THE INVENTION

This invention relates to metal cutting machines for cutting parts from relatively large flat metal plates by means of a multiplicity of thermal torches of the oxyflame, plasma or other suitable types.

It is already known to feed fluids, gasses, electrical signals and the like to the multiple torches through cables and conduits attached to a festoon support system, as disclosed in at least some of the above-identified patents.

In addition, an already known metal cutting machine has been developed and which utilizes a festoon and torch supply arrangement, including a manifold, and with these elements being fixed relative to the machine.

In the said cutting machine, a transverse bridge is mounted at its ends on two end trucks which are movable longitudinally; that is, normal to the transverse bridge. A master carriage is mounted for driving movement along the bridge and carries a master torch. A torch bar is suspended from the front side of the bridge by end slides which are freely movable along the bridge, with the bar carrying a plurality of roller-mounted saddles which in turn carry small slave torches. Both the master torch carriage and slave torch saddles may be selectively clamped to the torch bar.

In the same machine, when both the master torch and the slave torches are thus clamped to the torch bar, and the master torch drive actuated to move it transversely along the bridge, the torch bar, which is shorter than the bridge, is also carried along by the master torch and in turn carries the slave torches along also. Thus, multiple torch cutting may be accomplished. When only the master torch is to cut metal, all the torches are unclamped from the torch bar. Then, as the master torch is driven in either transverse direction along the bridge, it moves therealong until its carriage engages the slave torch saddles and thereupon pushes the saddles along ahead of itself until the end saddle engages a stop on the torch bar end. Subsequently, the torch bar is also thereby moved along the bridge.

With this arrangement, the master torch is able to move over substantially the entire cutting width of the machine without the need to remove the slave torches or limiting torch travel, even when as many as 8 or 10 torches are in the system.

As a part of the said machine, the supply cables for the torches were mounted to an overhead festoon system which was fixedly mounted to the machine frame or bridge. These cables were usually fed from a manifold which was also similarly fixedly mounted. The result was that the supply cables were of necessity quite long and subject to wear, due to their weight and the fact that they tended to come into contact with numerous machine elements. Furthermore, some electronic controls for the master torch and drives were mounted in the master torch carriage, making it exceedingly bulky.

It is a task of the present invention to reduce the length of the torch supply cables and thereby reduce their cost and the aforementioned problems of wear. Furthermore, it is a task of the invention to place other equipment and at least some torch controls in the most advantageous position, for example, to re-position the master torch controls off of the master torch carriage so that the latter's bulk is reduced. This re-positioning must, of course, not interfere with the efficient operation of the machine. It is a further task to reduce the spacing of the cutting heads as compared to what was previously possible, and to maximize the operating width or travel of the master torch.

In accordance with one aspect of the invention, the machine of the above-described type is provided with cantilevered supports which form rearward extensions of the torch bar and slide suspension members, and with the torch cable festoon being mounted to the said cantilevered supports. Thus, the festoon, instead of being fixed, moves along the bridge in response to movement of the torch bar which, in turn, moves when: (a) the master torch is clamped to the torch bar and is driven along the bridge, or (b) the unclamped master torch drives the slave torches ahead of it and into engagement with the torch bar stop.

In accordance with another aspect of the invention, the said cantilevered supports form part of a mount element behind the bridge which moves with the supports and carries the manifold, electronic controls and other supply and operation equipment with it. The requirement for disposing some of this equipment in the actual operating path of the torch carriages and saddles is thus substantially reduced.

BRIEF DESCRIPTION OF THE DRAWINGS

The accompanying drawings illustrate the best mode presently contemplated by the inventor for carrying out the invention.

In the drawings.

DESCRIPTION OF THE PREFERRED EMBODIMENT

Figure 1:
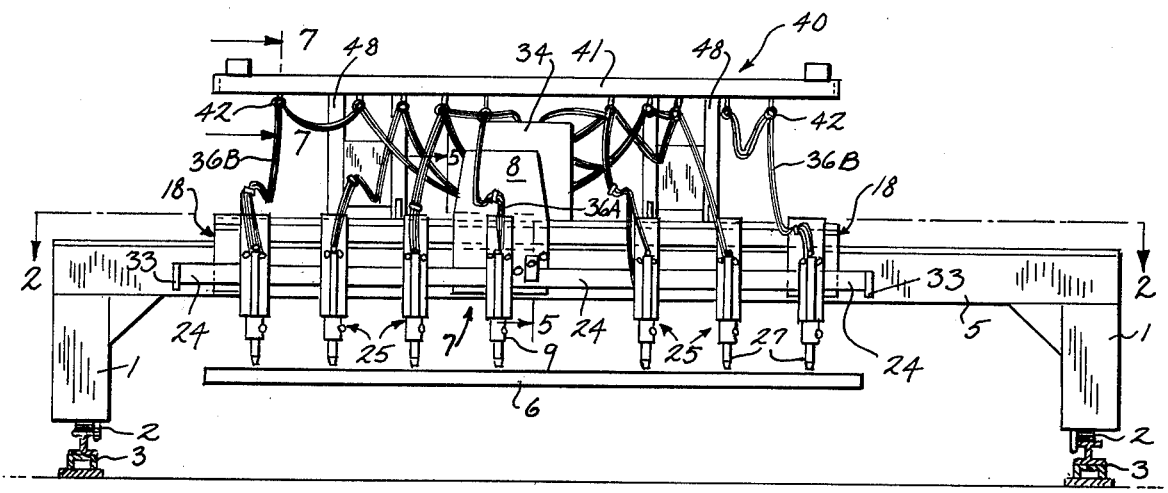
FIG. 1 is a front elevation of a metal cutting machine constructed in accordance with the concepts of the invention.
Figure 2:
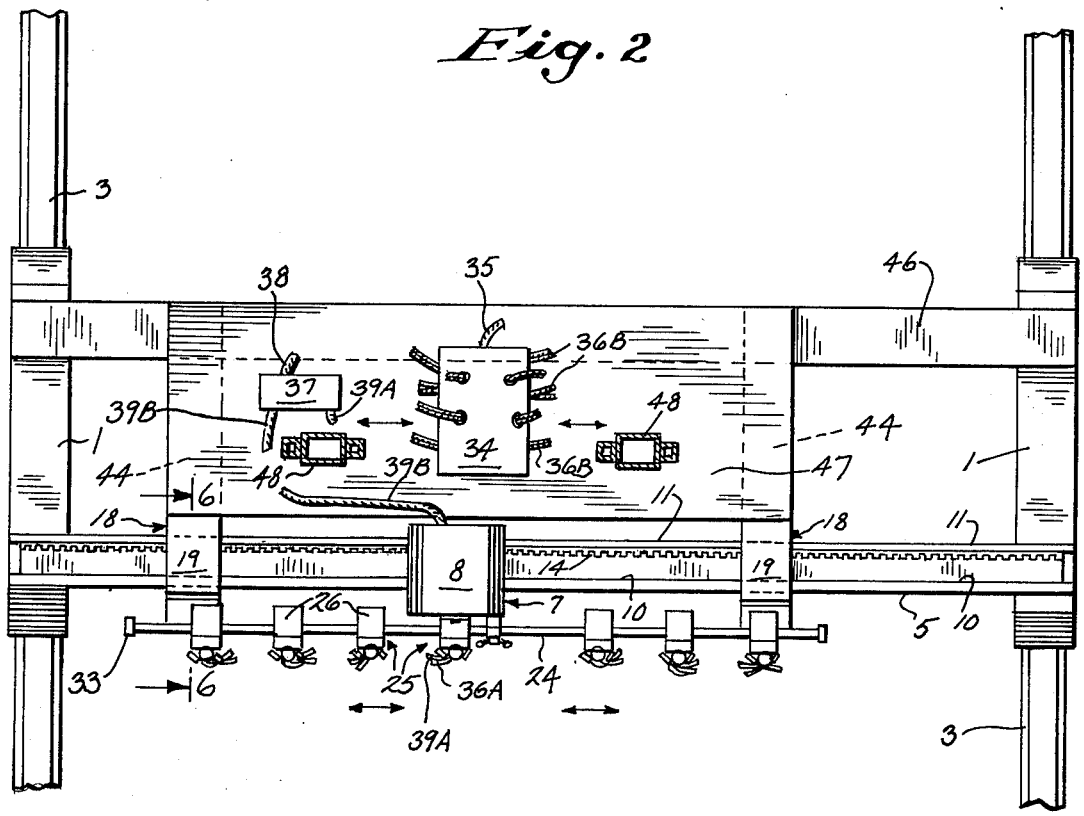
FIG. 2 is a horizontal section taken on line 2—2 of FIG. 1.
Figure 4:
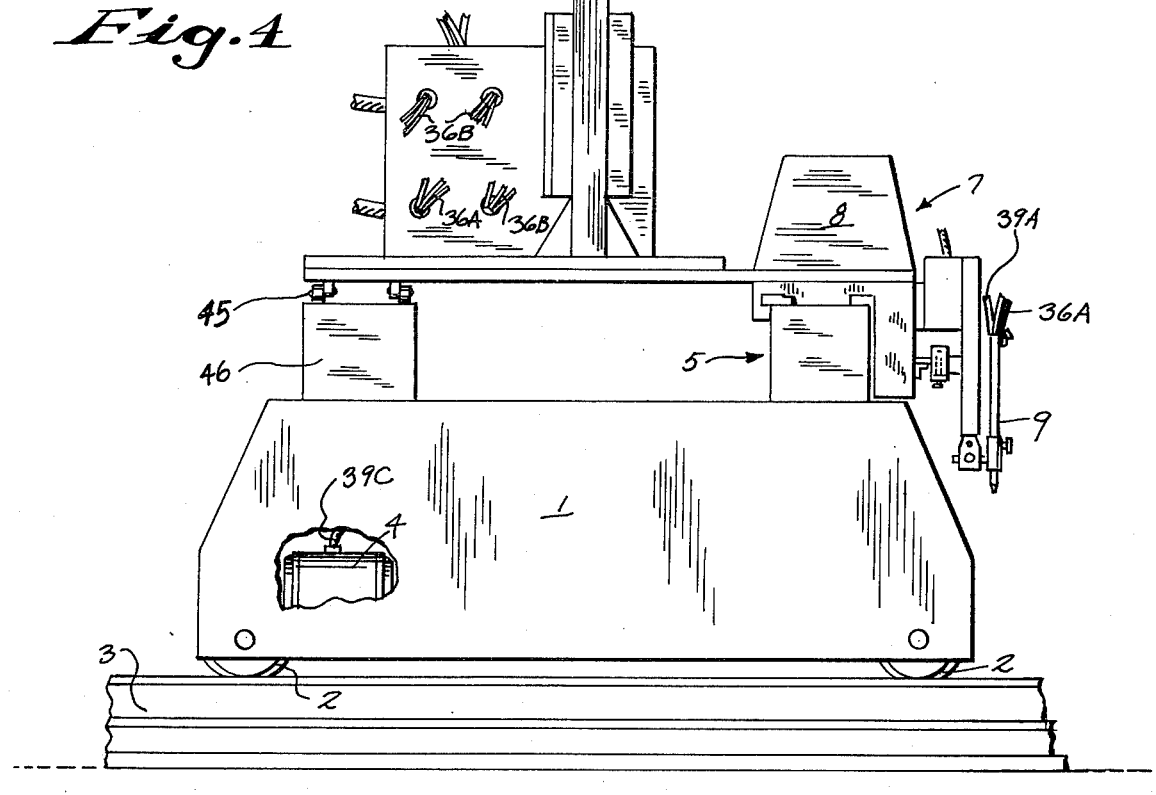
FIG. 4 is a left end view of the machine, with parts broken away for purposes of clarity.

As best shown in FIGS. 1, 2 and 4, the metal cutting machine of the invention includes a pair of end trucks 1 having rollers 2 thereon and which are adapted to be driven along floor rails 3 by any suitable well-known servo drive or the like, including a motor or motors 4. For this type of machine, the movement along rails 3 during cutting is usually referred to as being in a longitudinal direction.

An elongated box-like bridge 5 is secured to and extends transversely between trucks 1 in a direction normal to rails 3. Bridge 5 is adapted to support thermal metal cutting means for cutting one or a plurality of pieces from a flat metal plate 6, shown schematically in FIG. 1. One of the metal cutting means comprises a master torch assembly 7 which comprises a carriage 8 and a master torch 9. Bridge 5 supports assembly 7 for driving movement therealong, and for this purpose, a pair of opposed front and rear rails 10 and 11 are disposed on the upper bridge wall. See FIG. 5. A plurality of rollers 12 on carriage 8 support assembly 7 on the rails, and horizontal carriage guide rollers 13 engage the front and rear edges of front rail 10 to stabilize the carriage. In addition, rear rail 11 is formed as a rack with gear teeth 14 which mesh with a pinion 15 disposed on the lower end of the drive shaft 16 of a motor 17 mounted within the housing of carriage 8. Motor 17 may be driven by any suitable well-known means as by a servo control, not shown, to thereby move master torch assembly 7 in either direction along bridge 5.

It is contemplated that in addition to master torch 9, a plurality of supplemental thermal metal cutting means are provided. For this purpose, and referring particularly to FIGS. 1, 2 and 6, a pair of spaced slide elements 18 are mounted for free movement along bridge 5. Slide elements 18 include a front horizontal portion 19 having rollers 20 and 21 which correspond in position and function with rollers 13 and 14 on master torch assembly 7. Elements 18 each have a front downwardly depending portion 22 having a bracket 23 thereon. A torch bar 24 extends parallel to bridge 5 and is fixedly secured to brackets 23. Thus slide elements 18 and torch bar 24 are normally freely movable transversely along the bridge. As shown, torch bar 24 is somewhat shorter than bridge 5.

A plurality of slave torch assemblies 25 are suspended from torch bar 24 on each side of assembly 7, with each assembly 24 comprising a saddle 26 and a slave torch 27. A rearwardly extending arm 28 on each assembly 25 is provided with horizontal and vertical rollers 29 and 30 respectively which support the assembly for normally free rolling movement on torch bar 24.

Figure 5:
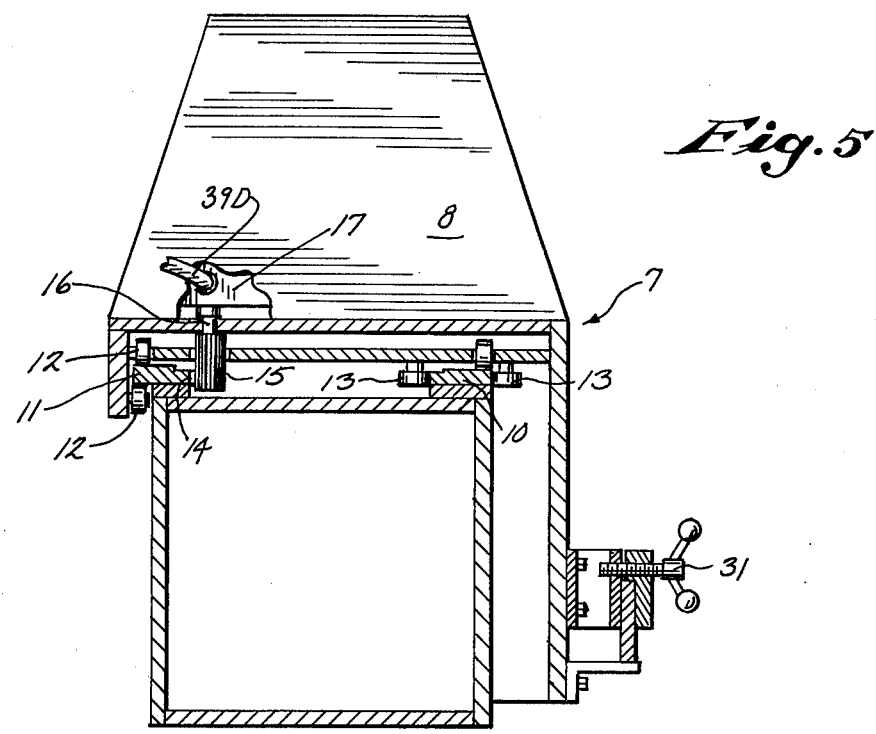
FIG. 5 is an enlarged section of the master torch carriage and drive mechanism taken on line 5—5 of FIG. 1.
Figure 6:
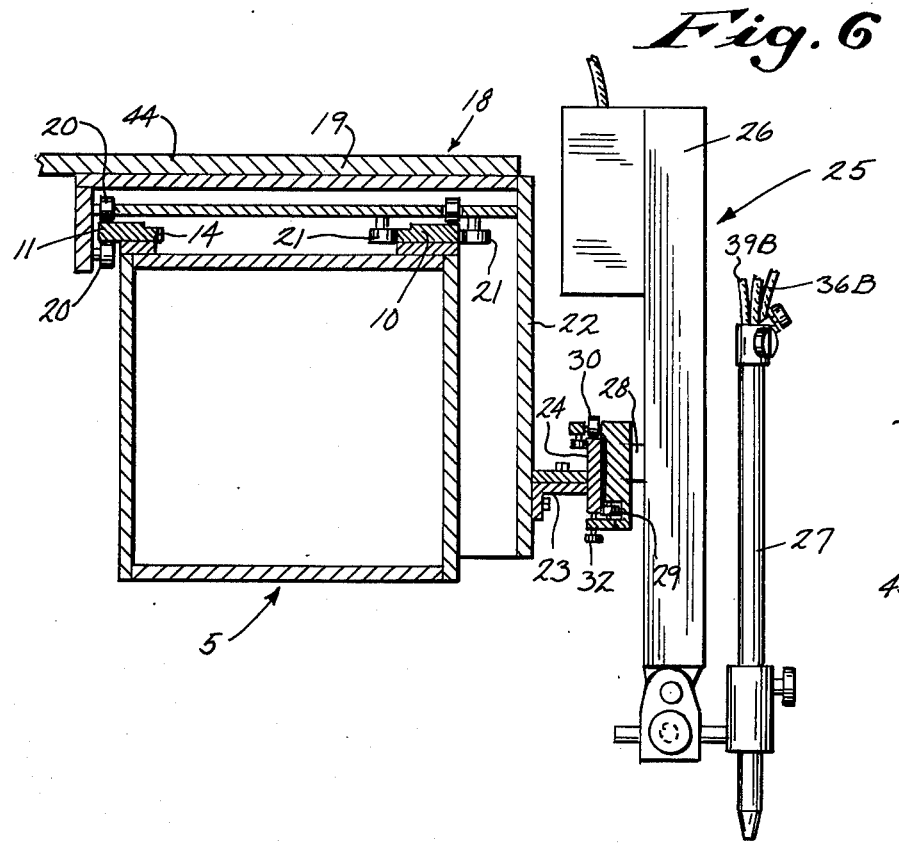
FIG. 6 is an enlarged vertical section taken on line 6—6 of FIG. 1 and showing the slave torch mounting mechanism.

Means are provided to selectively clamp master torch assembly 7 and each slave torch assembly 25 to torch bar 24. For this purpose, a manual clamp 31 is provided for assembly 7 as best shown in FIG. 5, and a similar clamp 32 is provided for each assembly 25 as best shown in FIG. 6.

The metal cutting machine incorporating the invention may be operated in a number of desired ways. For example, and referring to FIG. 2, master torch assembly 7 and slave torch assemblies 25 may all be clamped to torch bar 24. The torches may be suitably energized and motor 17 actuated to drive assembly 7 along bridge rails 10 and 11 in either desired transverse direction. When a workpiece 6 is disposed beneath the bridge and trucks 1 move on rails 3, a plurality of similar pieces are thus contour cut by the torches by virtue of the fact that the clamped slave torches 27 and torch bar 24 are all tied to the master torch assembly 7. The maximum extent of movement of the torches in either transverse direction is limited by the ends of bridge 5, beyond which slide elements 18 cannot travel.

In other instances it may be desired to provide a single cut of the workpiece by utilizing only master torch 9. With the present device, torch 9 can traverse almost the entire length of bridge 5, even though slave torches 27 are present. To accomplish this desired result, projection-like stop members 33 are disposed on at least one end and in this instance each end of torch bar 24. Master torch assembly 7 and torch assemblies 25 are unclamped from the bar and freely movable thereon.

Figure 3:
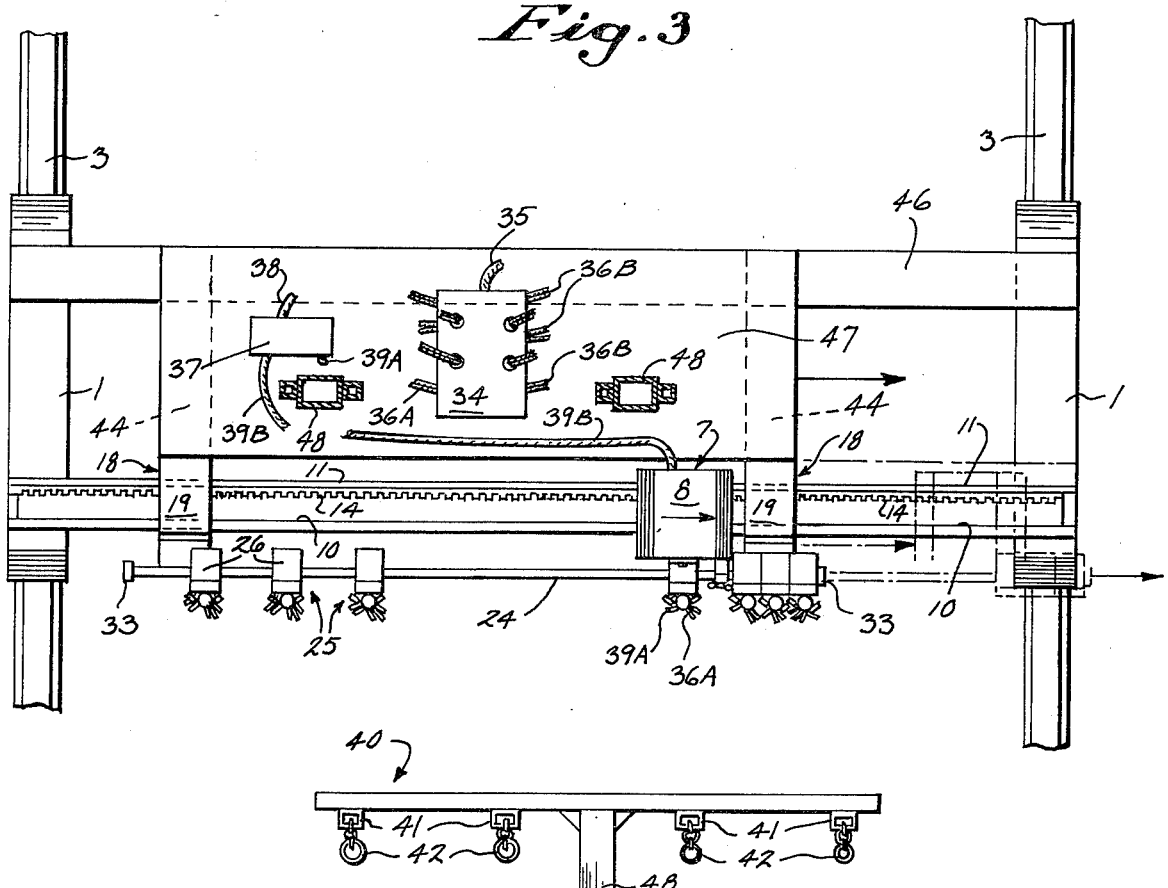
FIG. 3 is a view similar to FIG. 2 and showing driving of the slave torches, torch bar and connecting elements by the master torch.

As best illustrated in FIG. 3, when motor 17 is actuated to drive master torch assembly 7 toward the right end of the bridge, assembly 7 slides over bar 24 and eventually engages the near right slave assembly 25. Continued driving movement of assembly 7 pushes assemblies 25 rightwardly until the right bar stop 33 is engaged by the rightmost assembly 25 of the piled up group of assemblies, as shown in full lines. Upon further driving movement of assembly 7, the entire group of torches will move to the right, pulling with them the torch bar 24 and its connected slide elements 18, until the right end of the bridge is reached, as shown in phantom lines. Master torch assembly 7 can thus closely approach the bridge end. Reversing the motor 17 will create a similar action at the other end of bridge 5.

Torches 9 and 27, as well as motors 4 and 17 are serviced and controlled through a plurality of cables in a manner generally well-known and disclosed in at least some of the previously identified patents. As best shown in FIGS. 1-4, a gas manifold 34 is provided with gas input conduit 35 and a plurality of output conduits or cables 36A and 36B which in turn connect to the master and slave torches 9 and 27 respectively for feeding thermal fluid to the cutting areas. In addition, an electric control box 37 is provided and which has an input line 38 and a plurality of electrical output lines or cables 39A–D which in turn are connected to torch 9, torches 27, motor 4 and motor 17 respectively. Cables 39A and 39B may be used to provide the starting spark for thermal cutting, while cables 39C and 39D may be used to energize the motors to provide compound torch movement.

Figure 7:
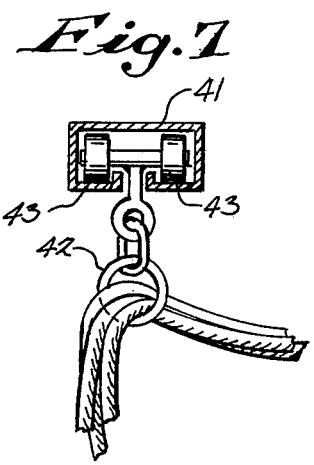
FIG. 7 is a vertical section taken on line 7—7 of FIG. 1 and showing the festoon cable carriers.

It is essential to prevent the various service cables 36 and 39 from tangling in the machine and with each other during metal cutting. For this purpose, a festoon system 40 is provided. Referring to FIGS. 1, 4 and 7, the festoon comprises a horizontal overhead frame or track 41 carrying a plurality of freely movable loops 42 suspended from rollers 43. The various cables 36 and 39 extend upwardly from their ends and are suspended at their midportions by passing through loops 42, high above the main machine elements.

Heretofore, the manifold 34 and festoon 40 were fixedly mounted to bridge 5 or the machine frame. This necessitated a longer festoon track and/or longer service cables to accommodate the end-to-end transverse movement of the torches. The end result was high cost and excessive cable wear. In addition, the electrical control system shown in box 37 was disposed in the housing of master torch carriage 8 so that the electrical output cables could be as close as possible to the other torches and motors.

In accordance with one aspect of the invention, the festoon 40 is no longer fixed to bridge 5 or the machine frame, but instead is mounted to move transversely along the bridge with torch bar 24. This festoon movement will be in response to driving movement of master torch assembly 7 along the bridge when the latter assembly is clamped to bar 24, as in FIG. 2. The festoon movement will also occur when bar 24 is pushed along the bridge by virtue of a stop 33 being pushed by the piled-up unclamped torch group, as in FIG. 3.

For purposes of providing festoon movement in unison with torch bar 24, and as shown in FIGS. 2–4, horizontal portions 19 of bar slide elements 18 extend rearwardly as at 44 and may be supported by rollers 45 on a transverse beam 46 which extends between trucks 1. A mounting platform or supporting surface 47 is supported between extensions 44. In this embodiment, the members 18, 44 and 47 form an idler carriage. Festoon track 41 is supported by frame portions or columns 48, the lower ends of which are anchored in platform 47.

As can be seen, elements 22, 19 and 44 form generally L-shaped cantilevered supports for the festoon.

In accordance with another aspect of the invention, manifold 34 and box 37 are mounted to platform 47 and thus move with festoon 40 and torch bar 24, reducing cable wear and eliminating the need for an overly large master torch carriage to house the electrical controls, and thus permitting close torch spacing.

During clamped movement of the torches and torch bar, as shown in FIG. 2, all of the service cables, the festoon, manifold and control box move in unison with the supporting platform 47. In the FIG. 3 situation, as previously described, master torch assembly 7 moves by itself initially and its service cables will roll along beneath festoon track 41 in the usual manner. When assembly 7 then engages and pushes slave torch assemblies 25 toward a stop 33, the service cables for assemblies 25 with also roll along beneath track 41. Up to this point, no festoon movement has occurred. However, once a stop 33 has been engaged and assembly 7 continues to drive toward the end of bridge 5, all of the above-identified members will again move as a unit, as when the torches are clamped, and assembly 7 can move to closely adjacent the respective end of bridge 5.

By placing the torch supply and control equipment on platform 47 or the like and away from the torch assemblies 7 and 25, the latter are positionable free of interference by the equipment to minimize the working distance between the respective torches. That is, they can be positioned closer together than heretofore.

Various modes of carrying out the invention are contemplated as being within the scope of the following claims particularly pointing out and distinctly claiming the subject matter which is regarded as the invention.

I claim:

1. In a metal cutting machine, the combination comprising:
    (a) a transverse bridge,
    (b) a master cutting torch assembly suspended from said bridge,
    (c) drive means to selectively move said assembly along said bridge between the ends thereof,
    (d) a torch bar disposed to one side of and extending parallel to said bridge,
    (e) stop means on at least one end of said torch bar,
    (f) a plurality of slave cutting torch assemblies suspended from said torch bar and normally freely movable therealong,
    (g) driven movement of said master torch assembly causing the latter to push said slave torch assemblies ahead of it and into engagement with said stop means,
    (h) support means mounting said torch bar for normally free movement along said bridge independent of said master torch assembly,
    (i) service cable means connected to the cutting torch of each said assembly,
    (j) festoon means for overhead support of said cable means and with said festoon means including a framework,
    (k) means responsive to movement of said torch bar along said bridge to cause said festoon framework to move in unison with said torch bar,
    (l) said master torch assembly drive means comprising means to move said festoon framework in unison with said master torch assembly, said slave torch assemblies, said torch bar and said support means after said stop means has been engaged.

* * * * *